Dec. 28, 1954 G. T. SEABORG ET AL 2,698,290
ISOTOPE OF CURIUM HAVING A MASS NUMBER OF 238
Filed Jan. 27, 1950 2 Sheets-Sheet 1

INVENTORS.
GLENN T. SEABORG
KENNETH STREET, Jr.
BY

Roland A. Anderson

ATTORNEY.

Dec. 28, 1954  G. T. SEABORG ET AL  2,698,290
ISOTOPE OF CURIUM HAVING A MASS NUMBER OF 238
Filed Jan. 27, 1950  2 Sheets-Sheet 2

INVENTORS.
GLENN T. SEABORG
KENNETH STREET, Jr.
BY
Roland A. Anderson
ATTORNEY.

United States Patent Office 2,698,290
Patented Dec. 28, 1954

2,698,290

ISOTOPE OF CURIUM HAVING A MASS NUMBER OF 238

Glenn T. Seaborg and Kenneth Street, Jr., Berkeley, Calif., assignors to the United States of America as represented by the United States Atomic Energy Commission Application January 27, 1950, Serial No. 140,903

3 Claims. (Cl. 204—154)

This invention relates to a new isotope of curium and to a method of producing the same.

Now it has been found that by bombarding plutonium 239 with alpha particles in a cyclotron the isotope of curium having a mass number of 238 is produced.

Accordingly, it is an object of the invention to provide the isotope of curium having a mass number of 238.

It is another object of the invention to provide a method for producing curium isotope 238.

The invention as to its characteristics, together with further objects and advantages thereof will become apparent from the following description and accompanying drawings of which:

Figure 1:
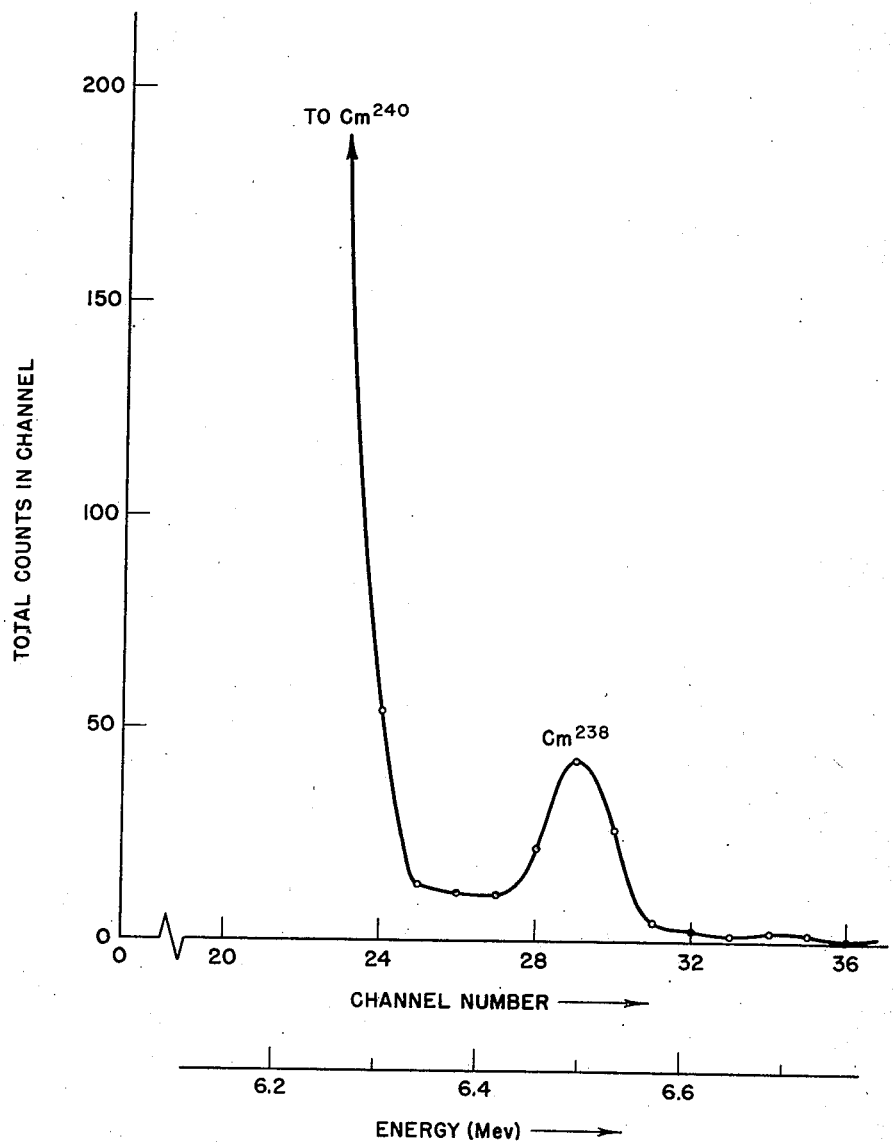
Figure 1 is a graphical representation of the results of an alpha pulse analysis of the product of the invention.

With the development of uranium neutron reactors and the production of large quantities of plutonium a starting material was available for experiments having as an object the production of isotopes of the higher mass numbered elements. Utilizing said material we produced the curium isotope 238 by the bombardment technique which may be set forth generally as follows: A target comprising plutonium isotope 239 is prepared and bombarded with a beam of 80 Mev. alpha particles from a cyclotron, thereby inducing a nuclear transformation of the plutonium and yielding the isotope of curium having a mass number of 238. It appears that the nuclear reaction involved is as follows: $Pu^{239}(\alpha,5n)Cm^{238}$. Then the bombarded plutonium containing the curium isotope is separated from extraneous materials forming the target and the curium isotopes formed in the bombardment are separated from the residual plutonium by chemical methods.

More particularly, a quantity of plutonium 239 sealed in a platinum container is subjected to bombardment with alpha particles whereby there is produced a mixture of products including the isotope of curium having a mass number of 238. The bombarded material is then dissolved in concentrated nitric acid containing a small amount of boric acid, with heating.

The bombarded material comprises a complex mixture of products including curium isotopes, plutonium of the original target material and a variety of rare earth fission products. Plutonium is eliminated from the mixture by oxidizing the plutonium to the VI oxidation state and precipitating lanthanum fluoride from the solution whereby the rare earth-americium-curium fraction of the product is precipitated. The precipitated material is then dissolved in a mixture of nitric and boric acids and ammonia is added to precipitate the rare earths, americium and curium as hydroxides and the precipitation is repeated in order to eliminate any residual plutonium from the mixture.

In order to effect a separation of the curium isotopes from the americium and from the rare earth materials, the process disclosed in the copending application of Kenneth Street, Jr., Serial No. 86,739, filed April 11, 1949, may be employed. The hydroxide precipitate obtained as described above is dissolved in dilute perchloric acid and the solution is contacted with a quantity of a cationic exchange resin to adsorb the dissolved materials thereon. The adsorbate is then transferred to the upper portion of a column containing additional cationic exchange resin and is selectively (chromatographically) eluted at low flow rates with a hydrochloric acid solution of about 13.3 M concentration. When treated in this manner the americium precedes the curium and both precede the rare earth elements down the column as the elution proceeds. Accordingly, the curium may be collected in a separate fraction of eluate after the americium has passed through the column.

The products may be identified by means of an alpha particle pulse analysis. Conviently, the pulse analysis may be performed utilizing a multi-channel differential pulse analyzer. In an instrument of the type employed to analyze the product of the invention, a thin sample is placed in an ionization chamber in which the total ionization of an alpha particle is measured as a voltage pulse. Individual pulses are sorted electronically and are recorded on fast mechanical registers thus allowing determination of the number of pulses occurring at discrete energy levels and the distinguishing of the number of pulses derived from particular alpha emitting isotopes in a mixture of alpha emitters.

The invention will now be described in more detail with reference to the following specific example of a preparation of the product in accordance with the invention.

Example

About 20 mg. of $NH_4PuF_6$ (isotope 239) was inserted as a slurry into a welded platinum envelope, the slurry was evaporated to dryness and the envelope sealed by clamping between two copper blocks. The whole assembly was then attached to the probe in a cyclotron chamber. The plutonium compound was then bombarded with 80 Mev. alpha particles for a period of about three hours and after bombardment the capsule was opened and the bombarded material was dissolved by heating with concentrated nitric acid containing a small amount of boric acid.

The residual plutonium was separated from the rare earth-americium-curium fractions by means of a lanthanum fluoride precipitation of said materials away from the plutonium remaining in the solution. More particularly, the plutonium in the solution was oxidized to the VI state by means of 0.1 N potassium dichromate. Then about 0.5 m. of $La(NO_3)_3$ was added to the nitric acid solution followed by the addition of sufficient hydrofluoric acid to precipitate the lanthanum together with the rare earth-americium-curium fractions as fluorides. The small amount of plutonium remaining with the precipitated material was eliminated by dissolving the precipitate in concentrated nitric acid containing a small amount of boric acid followed by precipitation of the rare earth-americium-curium fraction as hydroxides with ammonia. The cycle was repeated several times until all of the plutonium was eliminated from the mixture.

An ion exchange resin procedure was employed to separate the rare earths from the americium-curium fraction. More particularly, the hydroxide precipitate, obtained as described in the foregoing, was dissolved in about 100 microliters of 0.5 M perchloric acid and the solution was contacted and equilibrated with 25 microliters of Dowex 50 cation exchange resin in three successive portions to adsorb the rare earth-americium-curium thereon. The portions of resin were combined and introduced into the top of a 2 mm. diameter column 5 cm. in length and packed with colloidal agglomerates of Dowex 50 cation exchange resin. Dowex 50 resin as employed in the present process comprises a sulphonated polymer of a polyvinyl aryl compound, such as that described in U. S. Patent 2,366,007 (G. F. D'Alelio, August 11, 1942). The adsorbed material was eluted by passing 13.3 M hydrochloric acid slowly through the column. The americium-curium fraction was obtained when about 0.7 ml. of the elutriant had passed through the column and was entirely free of contamination with rare earth elements.

An alpha particle pulse analysis was then performed on the product with the results illustrated in Fig. 1. With reference to Fig. 1, the total number of counts appearing in each of a series of channels of the pulse analyzer are indicated on the ordinate scale and the particular channel is indicated along the abscissae scale. Following general practice a smooth curve is shown drawn through the experimental points. In order to allow easy translation of the arbitrary channel number into the corresponding alpha particle energy, a second scale calibrated in Mev. appears below said abscissae scale. As may be seen from said Fig. 1, there is present in the product derived according to the foregoing method, an isotope which emits alpha particles having an energy of about 6.5 Mev.

Figure 2:
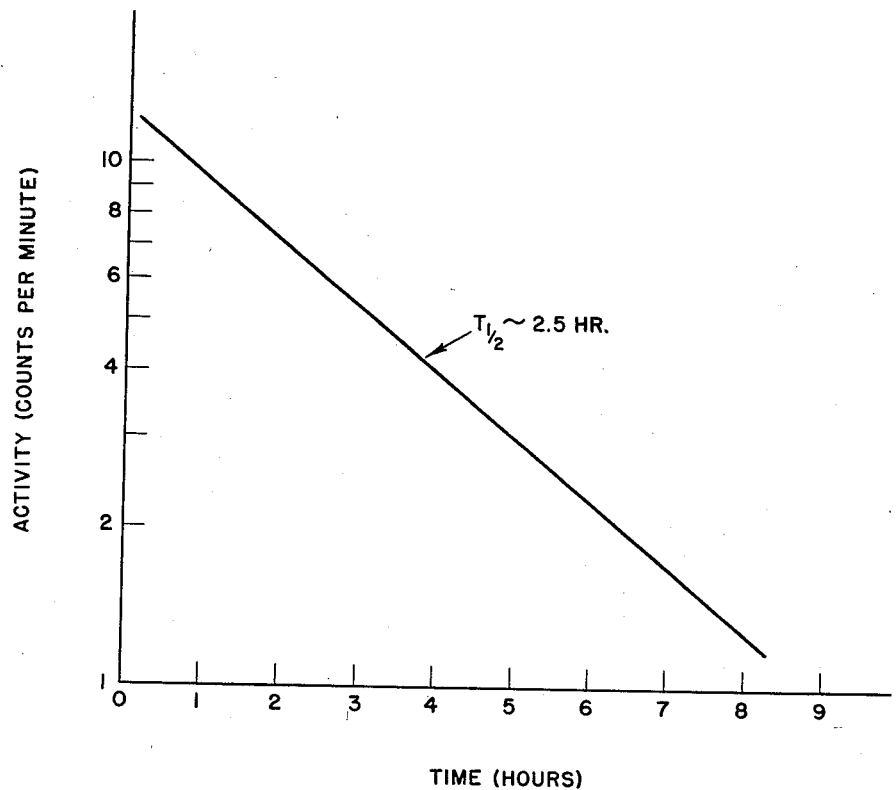
Fig. 2 is a graphical representation of the radioactive decay curve of the product of the invention.

A determination of the rate of radioactive decay for this material was made with the results indicated in Fig. 2. In Fig. 2 the number of disintegrations per minute are indicated on the logarithmic scale of ordinates while time is indicated on the linear ordinate scale. As may be seen from this curve representing the radioactive decay of the product isotope, the product isotope has a radioactive half-life of about 2.5 hours.

From a consideration of the method of its formation the chemistry of the product, the half-life and the alpha particle energy it appears that the identity of the product is best assignable as the curium isotope 238.

While there has been described in the foregoing what is, at present, considered to be a preferred embodiment of the invention, it will be understood that various modifications may be made therein and it is intended to cover all such that fall within the scope of the appended claims.

What is claimed is:

1. In a method of producing a radioactive curium isotope having a mass number of 238, a half-life of about 2.5 hours and emitting alpha particles of about 6.5 Mev. energy, the step comprising bombarding plutonium 239 with 80 Mev. alpha particles.

2. In a process for producing curium isotope 238, the steps comprising bombarding a quantity of plutonium isotope 239 with 80 Mev. alpha particles thereby producing therein said curium isotope 238 together with various rare earth fission products, dissolving the product mixture with concentrated nitric acid containing boric acid, oxidizing said solution to place the plutonium in the VI oxidation state, precipitating lanthanum fluoride from said solution thereby carrying the rare earth-americium-curium fraction away from the plutonium in the solution, dissolving the precipitate in a mixture of boric and nitric acids, treating the solution with ammonia to precipitate the rare earths, americium and curium as hydroxides away from residual plutonium in the solution, dissolving the hydroxide precipitate in perchloric acid, adsorbing the dissolved materials upon a cationic exchange material, and selectively eluting curium away from said rare earths and americium in a cationic exchange column with hydrochloric acid of about 13.3 M concentration.

3. The process as defined in claim 2 wherein said plutonium which is bombarded is present as the compound $NH_4PuF_6$.

References Cited in the file of this patent

Seaborg, Chem. Eng. News, vol. 23 (1945), pp. 2190–2193.

Seaborg et al., "The Transuranium Elements," MDDC–1609, U. S. A. E. C., 4 pages; date of manuscript, December 3, 1946; date declassified, March 24, 1947. (Copy in Patent Office Library.)

Seaborg, Chem. Eng. News, vol. 25 (1947), pp. 358.60 and 397.

Seaborg, Chem. Eng. News, vol. 25, 358–60, 397 (1947). (Copy in Patent Office Library.)

Hall, Chem. & Engr. News, vol. 30 (1952), page 234; Chem. & Engr. News, vol. 32 (February 22, 1952), page 920.